(12) United States Patent
An

(10) Patent No.: US 9,914,488 B2
(45) Date of Patent: Mar. 13, 2018

(54) PASSENGER COMPARTMENT MODULE BLOCK ASSEMBLY

(71) Applicant: Hyundai Motor Company, Seoul (KR)

(72) Inventor: Jae Hyun An, Chungcheongnam-do (KR)

(73) Assignee: Hyundai Motor Company, Seoul (KR)

( * ) Notice: Subject to any disclaimer, the term of this patent is extended or adjusted under 35 U.S.C. 154(b) by 47 days.

(21) Appl. No.: 15/248,014

(22) Filed: Aug. 26, 2016

(65) Prior Publication Data

US 2017/0247061 A1    Aug. 31, 2017

(30) Foreign Application Priority Data

Feb. 29, 2016  (KR) .......................... 10-2016-0023904

(51) Int. Cl.
 *B62D 25/14*   (2006.01)
 *B62D 21/15*   (2006.01)
(52) U.S. Cl.
 CPC .......... *B62D 25/14* (2013.01); *B62D 21/152* (2013.01)
(58) Field of Classification Search
 CPC ........ B60K 37/00; B60K 37/02; B60K 37/04; B62D 25/14; B62D 21/152; B62D 25/145; B62D 25/147
 See application file for complete search history.

(56) References Cited

U.S. PATENT DOCUMENTS

| 3,456,572 A | * | 7/1969 | Phaneuf | ............... B60H 1/3421 |
| | | | | 180/90 |
| 2002/0060475 A1 | * | 5/2002 | Kim | ....................... B62D 21/15 |
| | | | | 296/192 |

FOREIGN PATENT DOCUMENTS

| DE | 102006025384 A1 | * | 12/2007 | ............. B60K 37/00 |
| DE | 102013013356 A1 | * | 4/2014 | ........... B62D 25/145 |
| JP | H08119144 A | | 5/1996 | |
| JP | 2004338479 A | | 12/2004 | |
| JP | 2014-133469 A | | 7/2014 | |
| KR | 10-0314289 B1 | | 12/2001 | |
| KR | 10-2006-0004184 | | 1/2006 | |
| KR | 10-2008-0025564 | | 3/2008 | |
| KR | 10-0872932 | | 12/2008 | |

* cited by examiner

*Primary Examiner* — Lori L Lyjak
(74) *Attorney, Agent, or Firm* — Mintz Levin Cohn Ferris Glovsky and Popeo, P.C.; Peter F. Corless

(57) ABSTRACT

A passenger compartment module block assembly is provided. The passenger compartment module block assembly includes a center block which is made of composite material and disposed within a central portion of a crash pad and provided with assembly components formed on opposite sides of the center block, a driver block which is made of composite material and coupled to a first-side assembly component of the center block and disposed adjacent to a driver seat. A passenger block which is made of composite material and is coupled to a second-side assembly component of the center block and disposed adjacent to a passenger seat. The center block, the driver block and the passenger block are assembled integrally with each other and are disposed between a dash panel and a crush pad of a vehicle and to improve torsion and bending stiffness of the vehicle.

10 Claims, 10 Drawing Sheets

PASSENGER COMPARTMENT MODULE BLOCK ASSEMBLY

CROSS REFERENCE TO RELATED APPLICATION

The present application claims priority of Korean Patent Application No. 10-2016-0023904 filed on Feb. 29, 2016, the entire contents of which is incorporated herein for all purposes by this reference.

BACKGROUND

Field of the Invention

The present invention relates to a passenger compartment module block assembly and, more particularly, to a passenger compartment module block assembly having modularized blocks formed from composite material that are integrally assembled with each other and improve torsion and bending stiffness of a vehicle and provide installation locations for interior components.

Description of the Related Art

Generally, a passenger compartment module includes a cowl cross bar that traverses the width of a vehicle and is disposed within a crash pad to prevent an engine from being pushed into a passenger compartment during a vehicle collision. Recently, a carbon fiber reinforced plastic (CFRP) structures have been developed to substitute for the cowl cross bar to reduce the weight of the vehicle. However, the production cost increases due to the characteristics of the CFRP structure and mass production of various types of vehicles is limited. To overcome such limitation, research regarding a substitute that can be processed by solution treatment and take the place of the cowl cross bar has become more active.

The foregoing is intended merely to aid in the understanding of the background of the present invention, and therefore it may contain information that does not form the prior art that is already known in this country to a person of ordinary skill in the art.

SUMMARY

The present invention provides a passenger compartment module block assembly that includes modularized blocks formed from composite material integrally assembled with each other and improves the torsion and bending stiffness of a vehicle. Furthermore, installation locations of interior components are provided.

In one aspect, a passenger compartment module block assembly may include a center block disposed within a central portion of a crash pad and has assembly components formed on respective opposite sides of the center block and formed from a composite material, a driver block coupled to a first-side of the assembly components of the center block and disposed adjacent to a driver seat and formed from a composite material and a passenger block coupled to a second-side of the assembly components of the center block and disposed adjacent to a passenger seat and formed from a composite material. Wherein the center block, the driver block and the passenger block that are integrally assembled with each other may be disposed between a dash panel and a crush pad of a vehicle and may improve torsion and bending stiffness of the vehicle.

The driver block and the passenger block may form a symmetric structure based on the center block. The driver block or the passenger block may include a front surface which faces a back of the vehicle with an interior component mounted thereto, a rear surface coupled to the dash panel of the vehicle, a first side surface that connects the front surface and the rear surface to each other and has an assembly protrusion that extends sideways to be coupled with the corresponding assembly component of the center block and a second side surface that connects the front surface and the rear surface to each other and coupled to a lower portion of a front pillar of a vehicle body.

The driver block or the passenger block may include a main body having a predetermined thickness, a pair of protrusions that extend from opposite sides of the main body toward the back of the vehicle body and form the first side surface and the second side surface along with the main body and a connection component that connects the protrusions to each other and forms the front surface along with the protrusions. A length to which a lower portion of each of the protrusions extends rearward may be greater than that of an upper portion thereof. A medial portion of the protrusion may be formed to be inclined downward to connect the upper portion and the lower portion with each other.

A reinforcing member may be installed in medial and lower portions of each of the protrusions and may be configured to absorb shock when a vehicle collision occurs. The assembly protrusion may include a first protrusion that extends sideways from the first side surface and extends in a vertical direction of the driver block and a second protrusion that extends sideways from the first protrusion and has a cross-sectional area thereof with respect to a direction perpendicular to the protruding direction that is greater than a cross-sectional area of the first protrusion. Each of the assembly components of the center block may have a shape that corresponds to a shape of the assembly protrusion and may form an assembly rail configured to receive the assembly protrusion sildably inserted therein.

The composite material may include carbon fiber. A coupling aperture may be formed in the front surface and an insulation member may be disposed in the coupling aperture and cover both an interior surface of the coupling aperture and a portion of the front surface that contacts a connection bracket of the interior component. An insert nut may be disposed within the interior of the insulation member and may be coupled with a bolt to mount the interior component to the front surface. The composite material may include carbon fiber. A coupling aperture may be formed in the front surface and an insulation member may be disposed within the coupling aperture and may be configured to pass through both the coupling aperture and a connection bracket of the interior component. A screw may be coupled to the insulation member while forming a thread in the insulation member to mount the interior component to the front surface.

The center block may include a first body that extends in a vertical direction of the vehicle and a second body coupled to an upper portion of the first body and protruding toward a back of the vehicle. The assembly components may be successively formed in respective opposite side surfaces of the first and second bodies. A heating, ventilation and air conditioning (HVAC) may be mounted to front surface of the first body and an aperture may be formed vertically in a protruding component of the second body to extend a flow path from an outlet port of the HVAC to be in fluid communication with a duct disposed over the second body.

BRIEF DESCRIPTION OF THE DRAWINGS

The above and other objects, features and other advantages of the present invention will be more clearly under

DETAILED DESCRIPTION

Hereinafter, an exemplary embodiment of the present invention will be described with reference to the attached drawings.

The present invention will be described more fully hereinafter with reference to the accompanying drawings, in which exemplary embodiments of the invention are shown. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
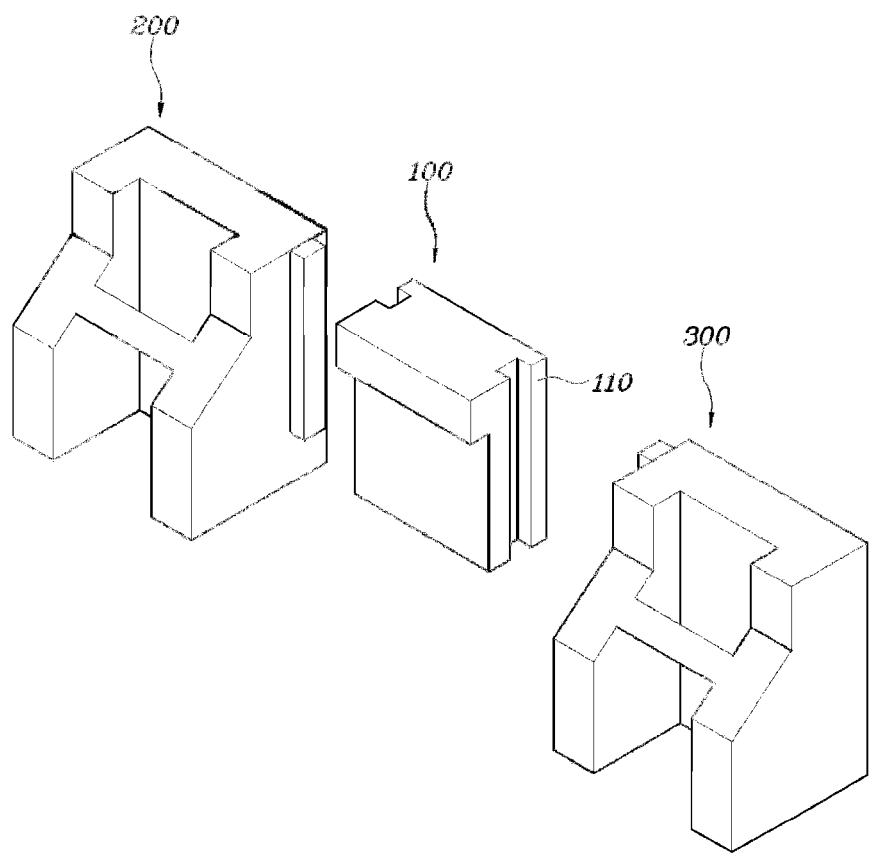
- FIG. 1 is an exemplary view a view illustrating a center block, a driver block and a passenger block according to an exemplary embodiment of the present invention.

As shown in FIG. 1, a passenger compartment module block assembly according to the present invention may include a center block 100 formed from a composite material and may have assembly components 110 disposed on opposite sides thereof and may be disposed within the interior of a central portion of a crash pad 1. The passenger compartment module block assembly may further include a driver block 200 formed from the composite material and may be coupled to a first-side assembly component 110 of the center block 100 and disposed adjacent to a driver seat and a passenger block 300 formed from the composite material and may be coupled to a second-side assembly component 110 of the center block 100 and disposed adjacent to a passenger seat. The center block 100, the driver block 200 and the passenger block 300 may be integrally assembled with each other and may be disposed between a dash panel 2 and a crush pad to improve torsion and bending stiffness of a vehicle.

The center block 100 may be a connector for the driver block 200 and the passenger block 300 that are disposed on opposite sides thereof. For example, the center block 100 may include the assembly components 110 that may be assembled with the driver block 200 and the passenger block 300. Furthermore, the center block 100 may be disposed within the interior of the central portion of the crash pad 1. The center block 100 may be formed from a composite material formed of resin and high strength reinforced fiber such as carbon fiber.

The driver block 200 may be coupled to the first-side assembly component 110 of the center block 100. The driver block 200 may be disposed adjacent to the driver seat within the interior of the crash pad 1 adjacent to the driver seat. Similar to the center block 100, the driver block 200 may also be formed from composite material of resin and high strength reinforced fiber (e.g., carbon fiber). The passenger block 300 may be coupled to the second-side assembly component 110 of the center block 100. The passenger block 300 may be disposed adjacent to the passenger seat within the interior of the crash pad 1 adjacent to the passenger seat. Similar to the center block 100 and the driver block 200, the passenger block 300 may be formed from a composite material formed of resin and high strength reinforced fiber such as carbon fiber. Glass fiber, aramid fiber or carbon fiber may be used as the reinforced fiber that forms the composite material. The resin may be thermoplastic resin or thermosetting resin. However, the present invention is not limited to this.

Figure 2:
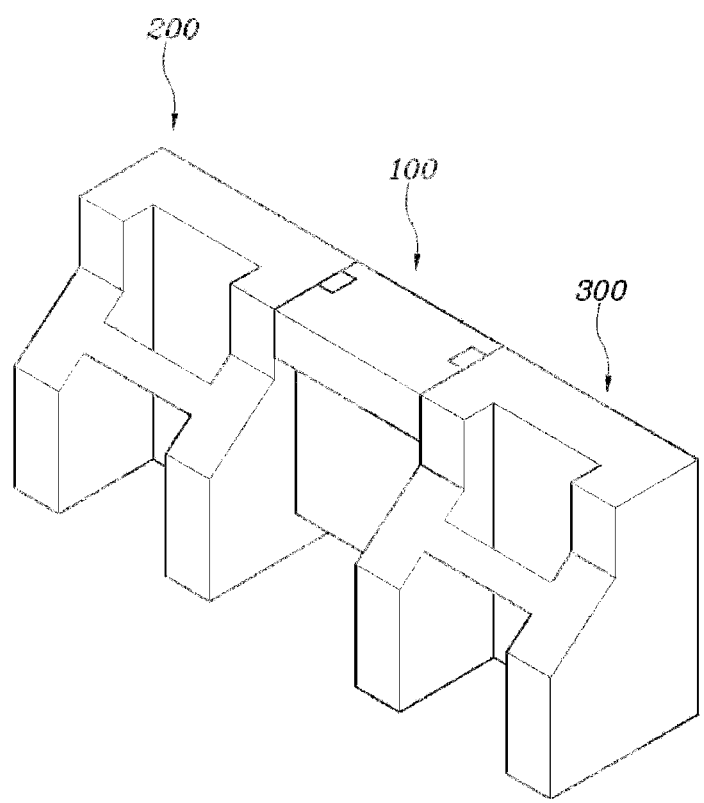
FIG. 2 is an exemplary view illustrating a passenger compartment module block assembly according to an exemplary embodiment of the present invention.

As shown in FIG. 2, the center block 100, and the driver block 200 and the passenger block 300 that are respectively coupled to the opposite sides of the center block 100 may be integrated with each other and coupled to a vehicle body at a position between the dash panel 2 and the crash pad 1. In particular, this assembly may be used in place of a conventional cowl clues bar, may be formed of composite material including reinforced fiber and may be coupled to the vehicle body in a transverse direction of the vehicle and to improve the torsion and bending stiffness of the vehicle. Furthermore, the assembly may provide a cavity for installation of interior components 10 that may include a cluster, a knee airbag, a passenger airbag, a glove box, a knee bolster, etc., a steering column 20 and HVAC. Compared to the conventional cowl cross bar, the passenger compartment module block assembly according to the present invention may reduce the weight of a vehicle and may improve the fuel efficiency of the vehicle since the vehicle is formed from composite material rather than metal.

The center block 100, the driver block 200 and the passenger block 300 that constitute the passenger compartment module block assembly may be manufactured by a resin transfer molding (RTM) method. In the present invention, even though the design changes based on the type of vehicle, a portion of the components may be required to change in consideration of the change in design and assembly it with the other components. Therefore, the present invention may improve the compatibility, and the common use of components. Furthermore, the driver block 200 and the passenger block 300 may form a symmetrical structure based on the center block 100.

Figure 3:
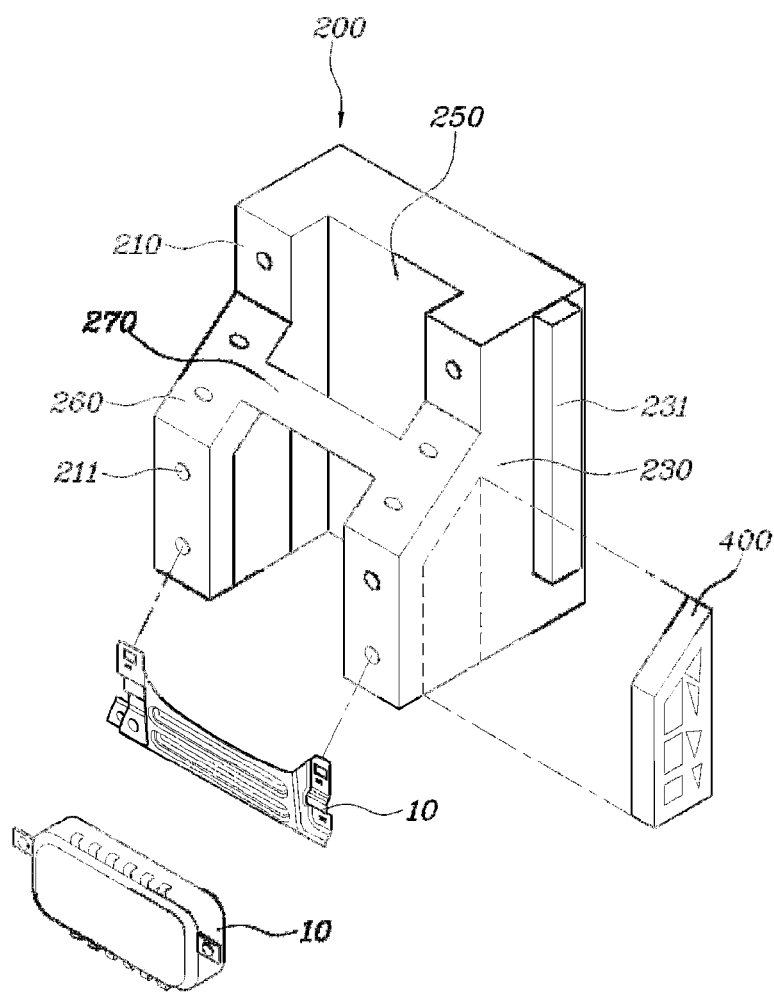
FIG. 3 is an exemplary view illustrating a driver block according to an exemplary embodiment of the present invention.
Figure 4:
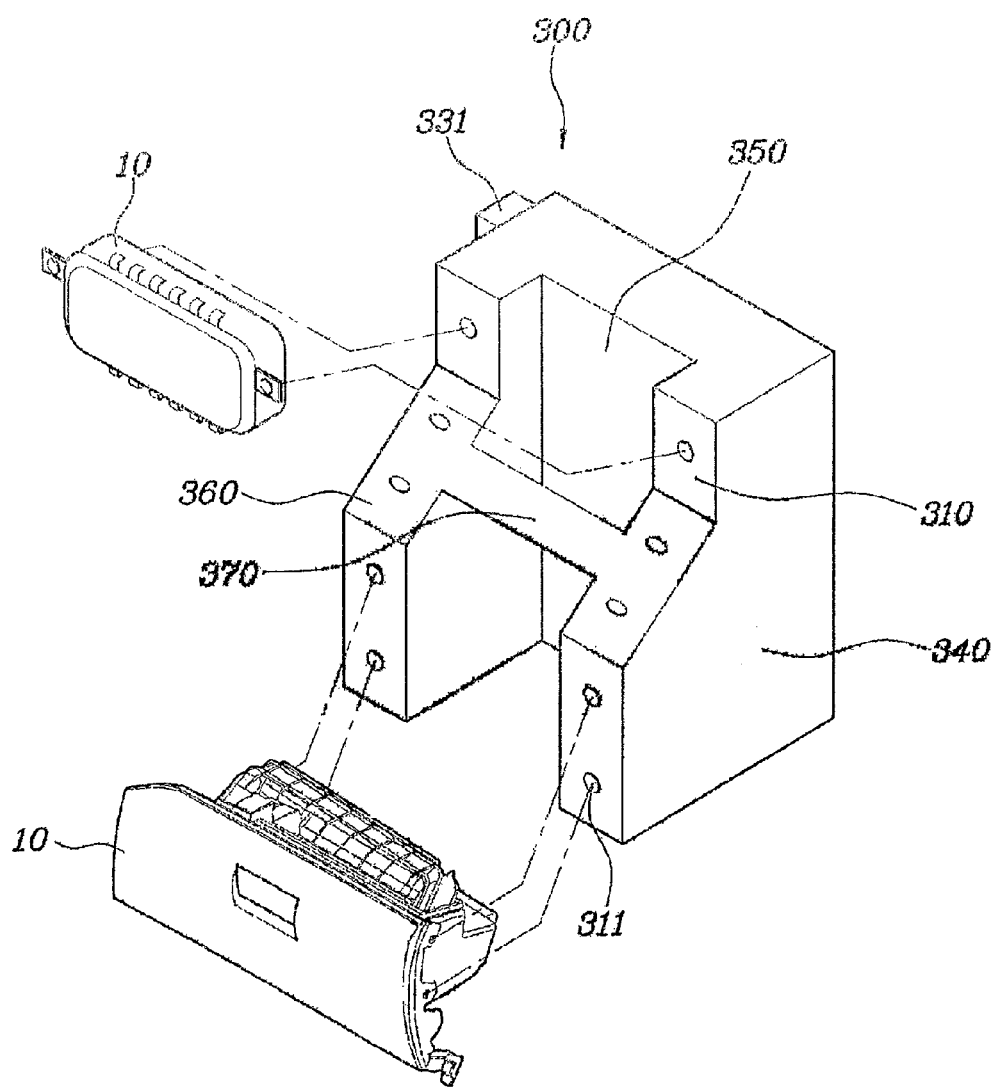
FIG. 4 is an exemplary view illustrating a passenger block according to an exemplary embodiment of the present invention.

In an exemplary embodiment according to the present invention, as shown in FIGS. 3 and 4, the driver block 200 or the passenger block 300 may include a front surface 210, 310 which faces the back of a vehicle that may be coupled to an interior component 10, a rear surface that may be coupled to a dash panel 2 of the vehicle, a first side surface 230 which connects the front surface 210, 310 with the rear surface and has an assembly protrusion 231, 331 that extends sideways to be coupled to the corresponding assembly component 110 of the center block 100 and a second side surface 340 which connects the front surface 210, 310 with the rear surface and may be coupled to a lower portion of a front pillar of the vehicle body.

Furthermore, the driver block 200 or the passenger block 300 may include a main body 250, 350 which has a predetermined thickness, a pair of protrusions 260 and 360 which extend from opposite sides of the main body 250, 350 toward the back of the vehicle body and thus form the first side surface 230 and the second side surface 340 along with the main body 250, 350 and a connection component 270, 370 which connects the protrusions 260 and 360 to each other and forms the front surface 210, 310 along with the protrusions 260 and 360. A length to which a lower portion of each protrusion 260, 360 extends rearward may be greater than that of an upper portion thereof. A medial portion of the protrusion 260, 360 may be formed to be inclined in the downward direction to connect the upper portion and the lower portion with each other.

In the driver block 200, as shown in FIG. 3, a cluster may be mounted to the upper portion of the front surface 210 and a knee airbag or a knee bolster or the like based on related regulations may be mounted to the lower portion of the front surface 210. The rear surface may be coupled to the dash panel 2 and may be coupled to the vehicle body. The assembly protrusion 231 may be disposed on the first side surface 230 which is perpendicularly bent from the front surface 210 and the rear surface. The assembly protrusion 231 may be coupled to the corresponding assembly component 110 of the center block 100. In the case of the passenger block 300, as shown in FIG. 4, a passenger airbag may be mounted to the upper portion of the front surface 310 and a glove box may be mounted to the lower portion of the front surface 310. The second side surface 340 may be coupled to the lower portion of the front pillar and fixed to the vehicle body.

The main body 250, 350 of the driver block 200 or the passenger block 300 may have a cuboid shape. A first surface of the main body 250, 350 positioned towards the front of the vehicle forms the rear surface thereof and may be coupled to the dash panel 2 of the vehicle. The protrusions 260 and 360 extend toward the back of the vehicle from a second surface of the main body 250, 350 that faces the back of the vehicle. The protrusions 260 and 360 may be provided in a pair. As shown in FIGS. 3 and 4, each protrusion 260, 360 may have a shape in which the lower portion thereof protrudes rearward a greater distance than the upper portion thereof. Therefore, a reinforcement member 400 may be installed in the medial and lower portions of each protrusion 260, 360. The reinforcement member 400 may be configured to absorb shock when a vehicle collision occurs and thus the safety of a driver or passenger may be improved. The reinforcement member 400 may have various shapes based on regulations or the designs of vehicles. The reinforcement member 400 may be formed of various materials including thermoplastic elastomer (TPE), polyethylene (PE) or polyurethane (PU). When the reinforcement member 400 is made of foamed material, the reinforcement member may be assembled in a sub-module form by diversifying the type thereof based on a foaming ratio or an internal energy absorption method.

The connection component 270, 370 may connect the downward inclined portions of the protrusions 260 and 360 with each other. Accordingly, the passenger compartment module block assembly may more stably support the steering column 20 which may be mounted to a central portion of the front surface 210, 310. Furthermore, the connection component 270, 370 may include a partition wall shape that may support the protrusions 260 and 360. For example, during a vehicle collision the protrusions 260 and 360 may effectively respond to the impact.

Figure 5:
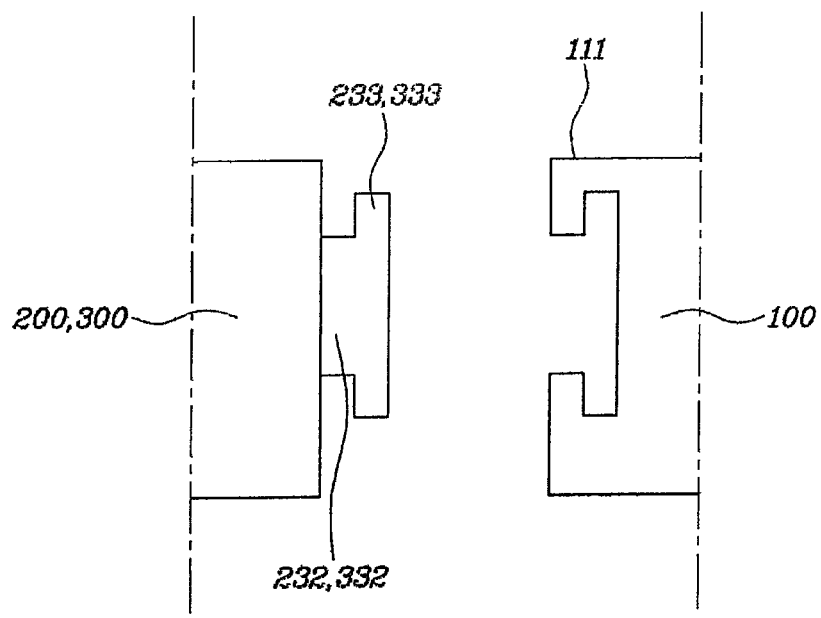
FIG. 5 is an exemplary view illustrating an assembly protrusion and an assembly mil according to an exemplary embodiment of the present invention.

As shown in FIG. 5, the assembly protrusion 231, 331 formed on the first side surface 230 of the driver block 200 or the passenger block 300 may include a first protrusion 232, 332 that extends sideways from the first side surface 230 and extends in a vertical direction of the driver block 200 and a second protrusion 233, 333 that extends sideways from the first protrusion 232, 332 and may include a muss-sectional area thereof with respect to a direction perpendicular to the protruding direction that may be greater than the muss-sectional area of the first protrusion 232, 332. The assembly component 110 of the center block 100 may include a shape that corresponds to the shape of the assembly protrusion 231, 331 and may form an assembly mil 111. The assembly protrusion 231, 331 may be configured to be slidably inserted into the assembly mil 111.

When the assembly protrusion 231, 331 including the first protrusion 232, 332 and the second protrusion 233, 333 are configured to be inserted into the assembly mil 111, the assembly between the blocks may be simplified. The assembled state among the center block 100, the driver block 200 and the passenger block 300 may be more reliably maintained even when an impact is horizontally applied thereto in the horizontal direction. For example, when reinforced fiber forming composite material is formed of carbon fiber 40, a connection bracket 11 of the interior component 10 formed from metal may be mounted and galvanic corrosion may occur due to a potential difference.

Figure 6:
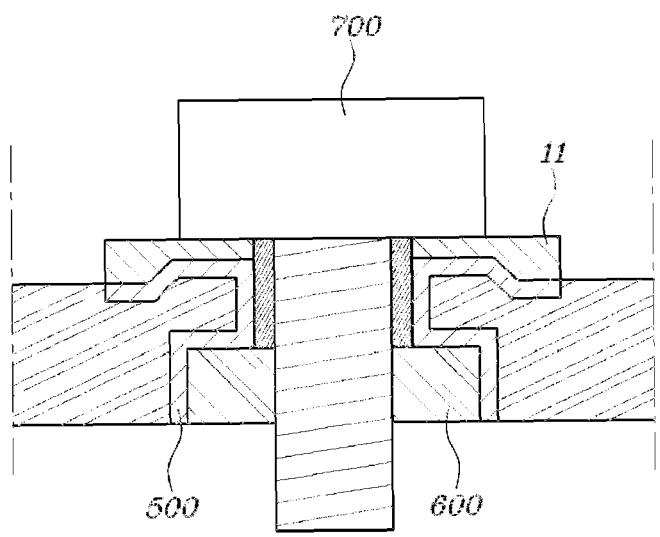
FIG. 6 is an exemplary view illustrating the connection of an interior component according to an exemplary embodiment of the present invention.

To prevent galvanic corrosion, as shown in FIG. 6, coupling apertures 211, 311 for mounting the interior component 10 may be formed in the front surface 210, 310 of the driver block 200 or the passenger block 300. Additionally, an insulation member 500 may be formed by insert injection molding to cover an interior surface of each coupling aperture 211, 311 and the surface of the front surface 210, 310 that comes into contact with the connection bracket 11 of the interior component 10. An insert nut 600 may be provided within the insulation member 500 and may be coupled with a bolt 700 to mount the interior component 10 to the passenger compartment module block assembly. The insulation member 500 may be formed of paint protection film (PPF) or thermoplastic material. The insulation member 500 may be fixed in that when the driver block 200 or the passenger block 300 are formed, the insulation member 500 may be disposed in the coupling aperture 211, 311 and then an insert injection molding process may be performed.

The insert nut 600 may be disposed within the insulation member 500. In particular, an insert pipe may be disposed along with the insert nut 600. The insert nut 600 and the insert pipe may be formed of light metal (e.g., aluminum or magnesium) to reduce the weight of the vehicle. Accordingly, the insulation member 500 may be configured to block the connection bracket 11, the bolt 700 and the insert nut 600 formed from steel from coming into contact with the driver block 200 or the passenger block 300 to prevent galvanic corrosion.

Figure 7:
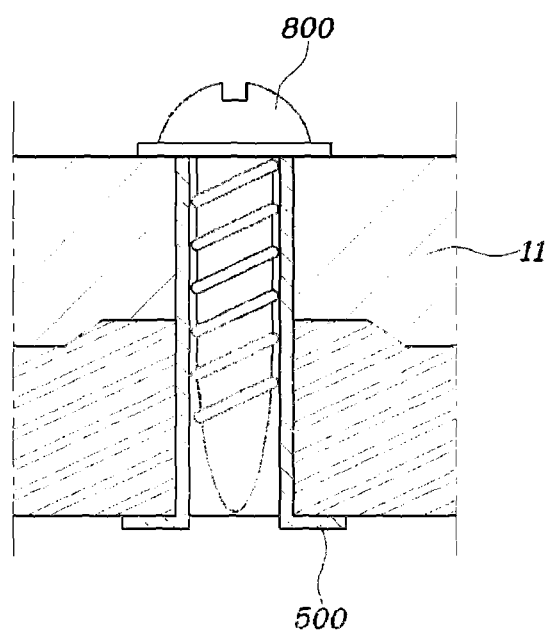
FIG. 7 is an exemplary view illustrating the connection of an interior component according to an exemplary embodiment of the present invention.

For example, when the connection bracket 11 of the interior component 10 mounted to the passenger compartment module block assembly is made of plastic, as shown in FIG. 7, an insulation member 500 may be disposed in the coupling aperture 211, 311 and may be configured to pass through both the coupling aperture 211, 311 and the connection bracket 11 of the interior component 10. A screw 800 may be tightened into the insulation member 500 while forming a thread in the insulation member 500, whereby the interior component 10 may be mounted to the driver block 200 or the passenger block 300. The insulation member 500 may be configured to block the screw 800 from coming into contact with the driver block 200 or the passenger block 300 and may prevent galvanic corrosion.

Figure 8:
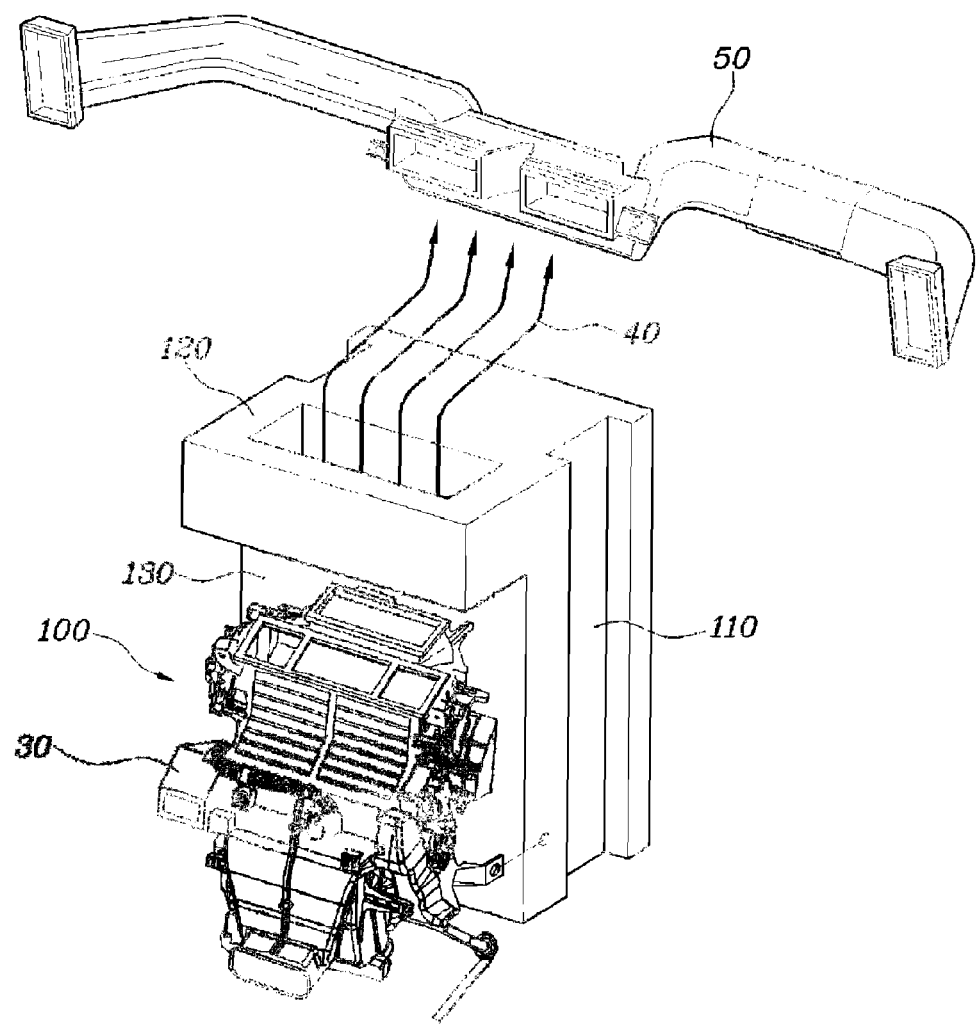
FIG. 8 is an exemplary view illustrating the connection of the center block and an HVAC according to an exemplary embodiment of the present invention.
Figure 9:
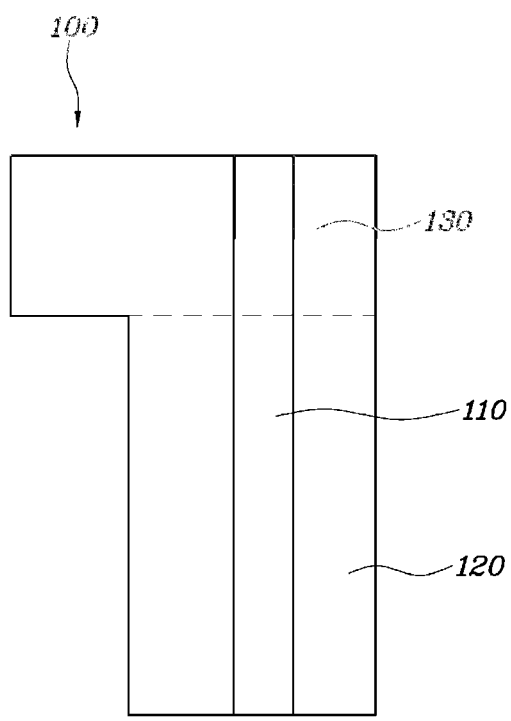
FIG. 9 is an exemplary side view of the center block according to an exemplary embodiment of the present invention.
Figure 10:
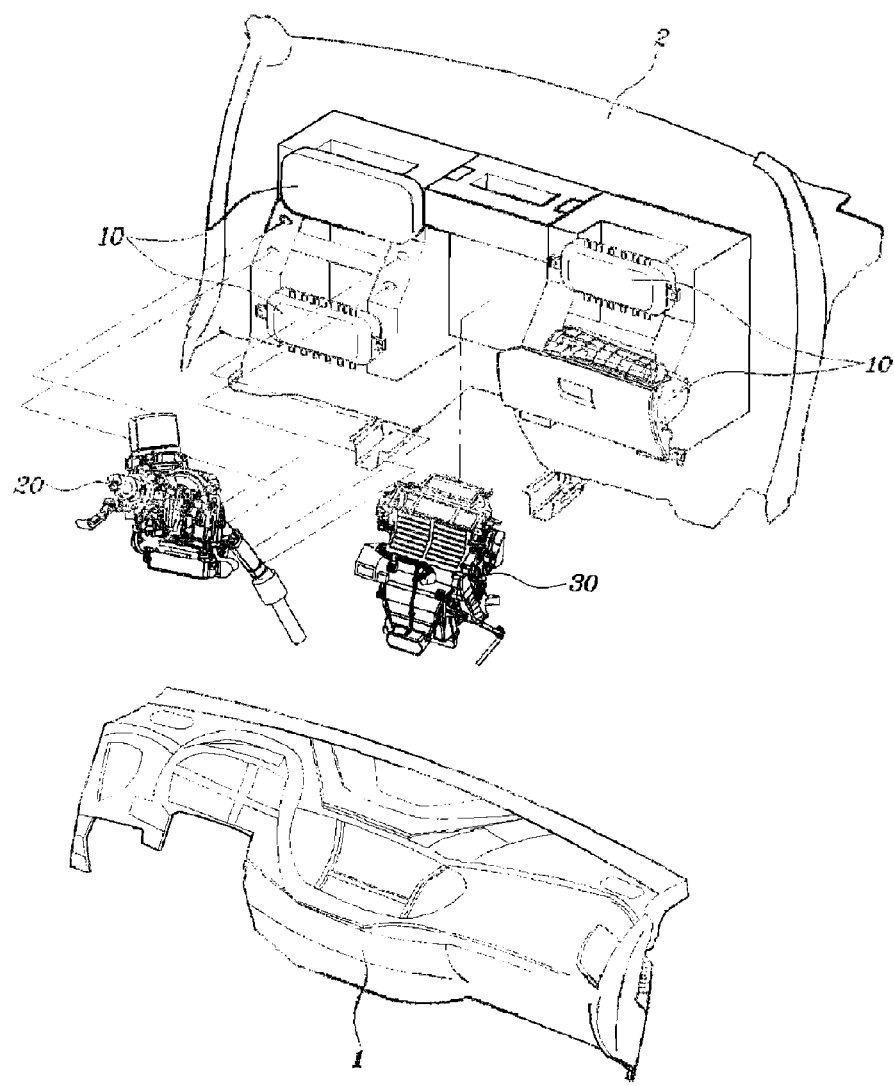
FIG. 10 is an exemplary view illustrating the passenger compartment module block assembly according to an exemplary embodiment of the present invention.

In the passenger compartment module block assembly according to the present invention, as shown in FIGS. 8 and 9, the center block 100 may include a first body 120 which extends in the vertical direction of the vehicle and a second body 130 that may be coupled to an upper portion of the first body 120 and protrudes toward the back of the vehicle. The assembly components 110 may be successively formed on opposite side surfaces of the first and second bodies 120 and 130. Furthermore, the HVAC 30 may be mounted to the front surface of the first body 120. An aperture 131 may be vertically formed in a protruding component of the second body 130 to extend a flow path 40 from an outlet port of the HVAC 30 to be in fluid communication with a duct 50 disposed over the second body 130.

The connection bracket 11 of the HVAC 30 may be coupled with the opposite side of the center block 100. The insulation member 500 that prevents galvanic corrosion may be formed by insert injection molding in each of the coupling apertures 211, 311 formed on the opposite sides of the center block 100. The flow path 40 may be formed in the aperture 131 that is vertically formed in the protruding component of the second body 130. Since the flow path 40 communicates the HVAC 30 mounted to the front surface of the first body 120 with the duct 50 disposed over the second body 130, the passenger compartment module block assembly may be suitable for the installation of the HVAC 30.

As described above, a passenger compartment module block assembly according to the present invention may include modularized blocks made of composite material that are integrally assembled with each other to improve torsion and bending stiffness of a vehicle and providing installation locations of interior components. Furthermore, the passenger compartment module block assembly substitutes for the conventional cowl clubs bar made of steel to reduce the weight of the vehicle. Additionally, the passenger compartment module block assembly may include an interior component that may be directly mounted to each block and may improve the production efficiency through common use of components and may optimize the production cost.

Although the exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A passenger compartment module block assembly, comprising:
    a center block disposed within a central portion of a crash pad and including assembly components formed on respective opposite sides of the center block, wherein the center block is formed of a composite material;
    a driver block coupled to a first side of the assembly components of the center block and disposed adjacent to a driver seat, wherein the driver block is formed of a composite material; and
    a passenger block coupled to a second side of the assembly components of the center block and disposed adjacent to a passenger seat, the passenger block is form of a composite material,
    wherein the center block, the driver block and the passenger block integrally assembled with each other are disposed between a dash panel and a crush pad of a vehicle and to increase torsion and bending stiffness of the vehicle.

2. The passenger compartment module block assembly according to claim 1, wherein the driver block and the passenger block form a symmetric structure based on the center block.

3. The passenger compartment module block assembly according to claim 1, wherein the driver block or the passenger block includes:
    a front surface which faces a back of the vehicle, and to which an interior component is mounted;
    a rear surface coupled to the dash panel of the vehicle;
    a first side surface that connects the front surface and the rear surface to each other and provided with an assembly protrusion that extends sideways to be coupled with the corresponding assembly component of the center block; and
    a second side surface that connects the front surface and the rear surface to each other and coupled to a lower portion of a front pillar of a vehicle body.

4. The passenger compartment module block assembly according to claim 3, wherein the driver block or the passenger block includes:
    a main body having a predetermined thickness;
    a pair of protrusions that extend from opposite sides of the main body toward the back of the vehicle body and form the first side surface and the second side surface along with the main body; and a connection component that couples the protrusions to each other and forms the front surface along with the protrusions, wherein a length to which a lower portion of each of the protrusions extends rearward is greater than that of an upper portion thereof, and a medial portion of the protrusion is formed to be inclined in a downward direction to connect the upper portion and the lower portion with each other.

5. The passenger compartment module block assembly according to claim 4, wherein a reinforcing member is installed in medial and lower portions of each of the protrusions and the reinforcement member is configured to absorb shock when a vehicle collision occurs.

6. The passenger compartment module block assembly according to claim 3, wherein the assembly protrusion includes:
    a first protrusion that extends sideways from the first side surface and extends in a vertical direction of the driver block; and
    a second protrusion that extends sideways from the first protrusion and has a cross-sectional area thereof with respect to a direction perpendicular to the protruding direction is greater than a cross-sectional area of the first protrusion, and
    wherein each of the assembly components of the center block has a shape that corresponds to a shape of the assembly protrusion and forms an assembly rail configured to sildably insert the assembly protrusion into the assembly rail.

7. The passenger compartment module block assembly according to claim 3, wherein the composite material includes carbon fiber,
    wherein a coupling aperture is formed in the front surface, and an insulation member is disposed in the coupling aperture and covers both an interior surface of the coupling aperture and a portion of the front surface that contacts a connection bracket of the interior component, and
    an insert nut is disposed within the insulation member and coupled with a bolt to mount the interior component to the front surface.

8. The passenger compartment module block assembly according to claim 3, wherein the composite material includes carbon fiber,
    wherein a coupling aperture is formed in the front surface, and an insulation member is disposed within the coupling aperture and is configured to pass through both the coupling aperture and a connection bracket of the interior component, and
    a screw is coupled to the insulation member and is configured to form a thread in the insulation member to mount the interior component to the front surface.

9. The passenger compartment module block assembly according to claim 1, wherein the center block includes:
    a first body that extends in a vertical of the vehicle; and
    a second body coupled to an upper portion of the first body and protrudes toward a back of the vehicle,
    wherein the assembly components are successively formed in respective opposite side surfaces of the first and second bodies.

10. The passenger compartment module block assembly according to claim 9, wherein an Heating, Ventilation and Air Conditioning (HVAC) is mounted to front surface of the first body, and an aperture is formed vertically in a protruding component of the second body to provide a flow path that extends from an outlet port of the HVAC to be in fluid communication with a duct disposed over the second body.

* * * * *